United States Patent [19]

Koch

[11] 4,287,157
[45] Sep. 1, 1981

[54] COAL HYDROGENATING APPARATUS HAVING MEANS FOR SEALING THE ROTARY DRIVE THEREOF

[75] Inventor: Klaus Koch, Laatzen, Fed. Rep. of Germany

[73] Assignee: Hermann Berstorff Maschinenbau GmbH, Hanover, Fed. Rep. of Germany

[21] Appl. No.: 151,762

[22] Filed: May 21, 1980

[30] Foreign Application Priority Data

Oct. 27, 1979 [DE] Fed. Rep. of Germany ....... 2943538

[51] Int. Cl.³ .............................. B01J 3/03; B01J 4/00; B01J 8/10; C10G 1/06
[52] U.S. Cl. .................................. 422/205; 208/8 R; 277/3; 277/135; 422/208; 422/226; 422/229; 422/233
[58] Field of Search ............... 422/205, 208, 226, 229, 422/233, 236; 208/8 R, 8 LE; 201/33, 36; 202/108, 118, 134, 135, 262, 265, 266, 269; 277/3, 15, 24, 135

[56] References Cited

U.S. PATENT DOCUMENTS

| | | | |
|---|---|---|---|
| 3,030,297 | 4/1962 | Schroeder | 208/8 R |
| 3,804,423 | 4/1974 | Booy | 277/3 |
| 3,910,428 | 10/1975 | Peterson | 277/135 |
| 4,014,555 | 3/1977 | Jacottet | 277/3 |
| 4,106,997 | 8/1978 | Kevorkian et al. | 202/118 |
| 4,123,070 | 10/1978 | Peterson | 277/135 |
| 4,206,713 | 6/1980 | Ryason | 202/118 |

*Primary Examiner*—Bradley Garris
*Attorney, Agent, or Firm*—Schwartz, Jeffery, Schwaab, Mack, Blumenthal & Koch

[57] ABSTRACT

A method and apparatus for sealing the drive end of a chamber for the preparation and hydrogenation of coal with hydrogen to form hydrocarbons in which the chamber comprises a hollow cylinder with a rotatable element therein having a conveying web thereon and in a sealing region a pressurized sealing substance such as coal particles mixed with oil is fed from a storage container through a feed passage into an annular recess at a pressure higher than that in the chamber so that the sealing substance passes through a conical annular gap which tapers towards the chamber. A further narrower gap on the drive side of the recess leads to a further annular recess from which the sealing substance can be extracted through a return pipe. Pressure comparison means control the feed pressure in the feed passage. The recesses and the annular gap can be provided by machining the rotatable element rather than the hollow cylinder and forward feed screw forms may be provided on the rotatable element in the sealing region.

10 Claims, 3 Drawing Figures

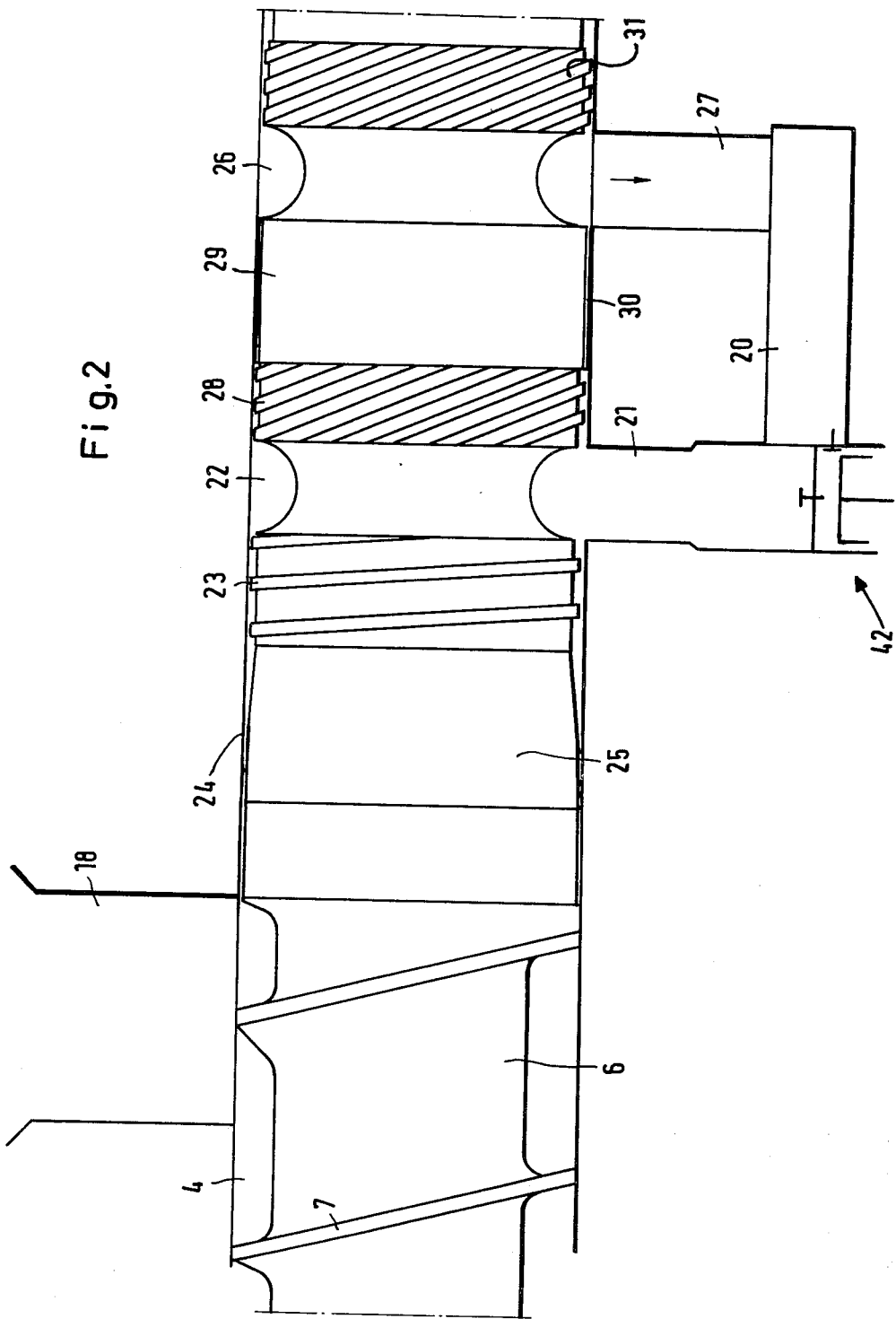

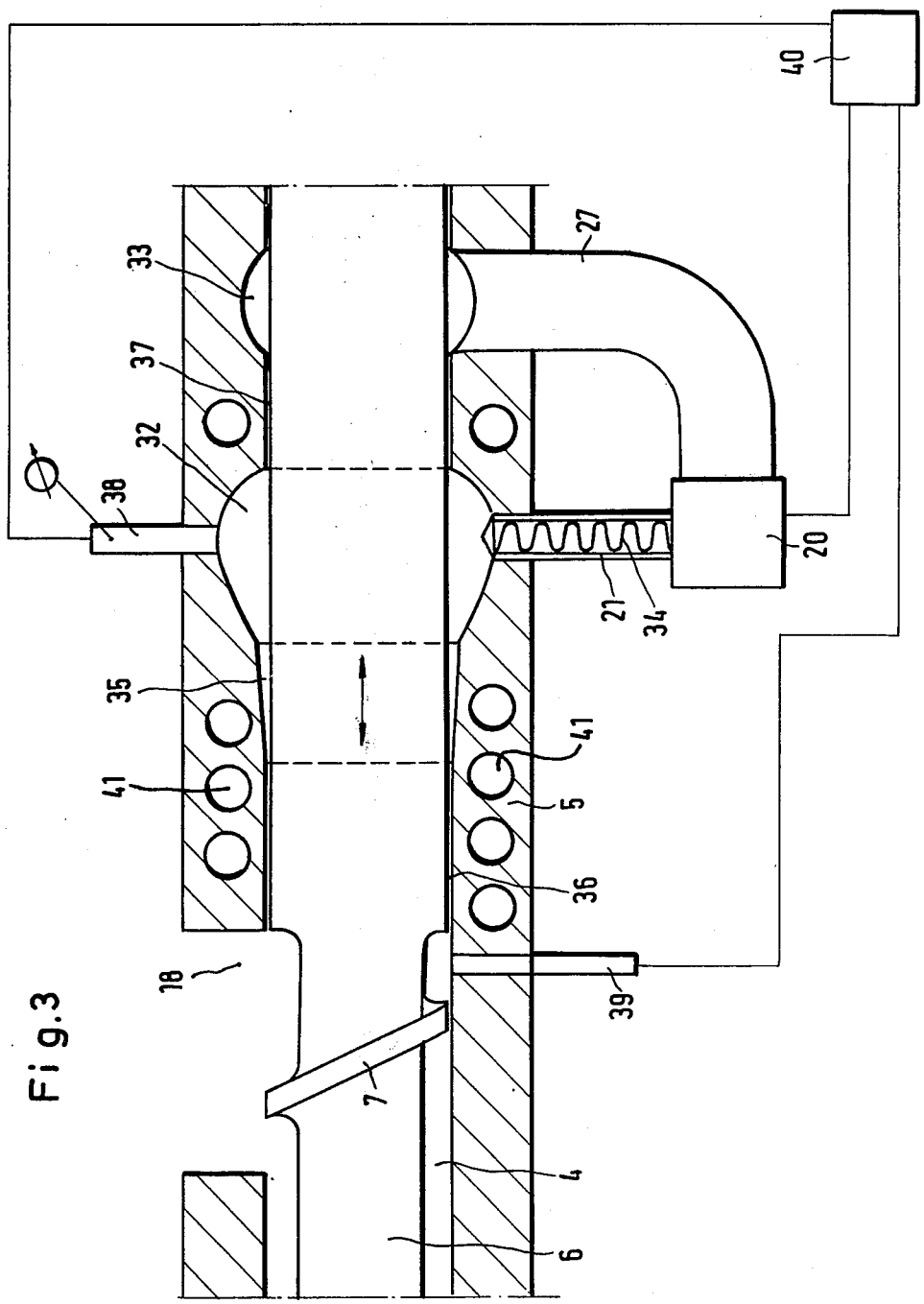

COAL HYDROGENATING APPARATUS HAVING MEANS FOR SEALING THE ROTARY DRIVE THEREOF

The invention relates to a method and apparatus for sealing the drive-side portion of a preparation and hydrogenation chamber, for hydrogenating coal with hydrogen to form hydrocarbons. Such a chamber may be formed by a hollow cylinder containing a rotatable element to convey particles of coal through the chamber.

Carbonic material, for example polymerised coal can be reacted with hydrogen to form hydrocarbons and hydrocarbon liquids, which can be converted into engine or general fuels or used as raw materials for the chemical industry.

When the hydrogenation of coal with hydrogen to form hydrocarbons is based on the use of dry coal particles which are either heated in a fluidized bed by the hydrogen or brought to the hydrogenating temperature separately in a pre-heating installation, a high pressure in the hydrogenating chamber is in all cases required for the reaction. U.S. Pat. No. 3,030,297 mentions a pressure of up to 400 bars. Many precautions have to be taken to enable such a high pressure to be built up in the hydrogenation chambers. Thus it is essential that the drive end of a rotatable conveying element for powered coal or coal mixed into a paste with oil should be sealed off against excess pressures of up to 500 bars.

The invention has among its objects to provide a method and apparatus for sealing against high pressure the drive-side portion of a preparation chamber for hydrogenating coal with hydrogen to give hydrocarbon; which apparatus must not be subject to undue wear and must not require maintenance.

The invention also has among its objects to provide a sealing system which will remain efficient even at temperatures of up to 500° C., which can be simple to produce, and which will guarantee a high degree of operating safety against escaping hydrogenation products at very high pressure.

According to the invention there is provided a method of sealing the drive-end of a preparation and hydrogenation chamber of apparatus for hydrogenating coal with hydrogen to form hydrocarbons, wherein the chamber comprises a hollow cylinder containing a rotatable element to convey particles of coal from a preparation portion of the chamber into and through a hydrogenation portion of the chamber, a sealing substance in paste form, is continuously fed from a storage container, under pressure, into a sealing region on the drive-side of the preparation and hydrogenation chamber to maintain the sealing substance at a higher pressure in the sealing region than the pressure prevailing in the adjacent portion of the chamber and the sealing substance, which exerts the sealing function, is forced continuously from the sealing region into the chamber.

Such a method can have the advantage that the sealing action can be maintained undiminished even at high temperatures. The constant supply of the sealing substance, preferably in the form of charge coal or materials with similar properties can provide a seal which is constantly renewed, and the arrangement does not suffer from the known, previously inevitable wear to seals and the constant waste of time necessary for dismantling and fitting new seals.

It is advantageous for the pressure in the sealing region to be measured and set constantly higher than that in the preparation and hydrogenation chamber by control means.

It is also possible to mix an additive with the charge coal in the storage container, the additive being used to enhance the sealing action and to take part in the hydrogenation process without adversely affecting it. Carbonic materials in paste or plastic form may be used instead of the charge coal, for example chloroprene, polyethylene or similar hydrocarbons or mixtures of these materials with charge coal.

Preferably excess sealing substance issuing from the drive-side of the sealing region is returned to the storage container.

Returning that part of the sealing substance which escapes from the drive end of the sealing region to the storage container and pumping it back into the first annular groove under pressure can reduce the consumption of the sealing substance.

According to another aspect of the invention, there is provided apparatus for sealing the drive-end of a preparation and hydrogenation chamber of apparatus for hydrogenating coal with hydrogen to form hydrocarbons comprising a hollow cylinder defining said chamber and containing a rotatable element to convey particles of coal from a preparation portion of the chamber into and through a hydrogenation portion of the chamber, a sealing region at the drive-side of the rotatable element, the sealing region comprising a conical annular gap formed between the wall of the hollow cylinder and the rotatable element adjacent an aperture for feeding the coal into the preparation portion of the chamber, the conical annular gap tapering towards the preparation portion of the chamber, a first annular space on the drive-side of the conical annular gap, a feed passage communicating the first annular space with a storage container and means for feeding a sealing substance in paste form from the storage container, under pressure, through the feed passage into the first annular space.

Advantageously the apparatus includes, on the drive-side of the first annular space and on the rotatable element, a locking screw thread and a cylindrical blocking portion with approximately the diameter of the hollow cylinder, a second annular space and a discharge passage connecting the second annular space to the storage container.

Preferably the conical annular gap tapering towards the preparation chamber is larger than a gap between the cylindrical blocking portion of the rotatable element and the wall of the hollow cylinder. This can ensure that the pressure generated by forcing the charge coal into the annular space will be exerted in the direction of the chamber and will convey the coal into the preparation and hydrogenation chamber.

The first and second annular spaces can be formed by providing annular grooves in either the rotatable element or in the cylinder surrounding the rotatable element.

The annular gap tapering conically towards the chamber may be formed by a conical portion of the rotatable element or by a conical portion milled in the cylinder.

The invention is diagrammatically illustrated by way of example in the accompanying drawings, in which:

FIG. 2 shows an embodiment with annular grooves in a friction element; and

FIG. 3 shows an embodiment with annular grooves in a cylinder.

Figure 1:
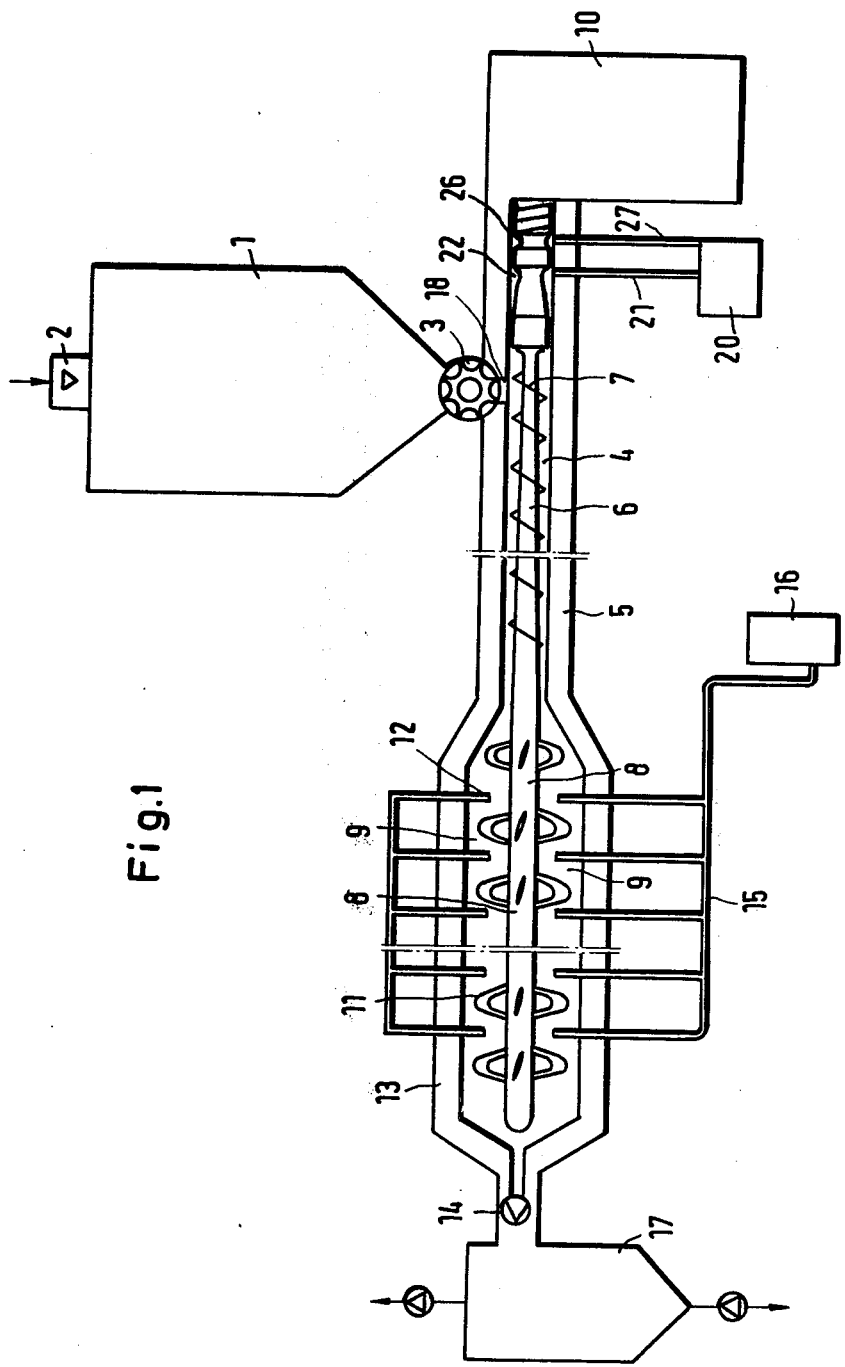
FIG. 1 is a longitudinal section through apparatus for hydrogenating coal with hydrogen to form hydrocarbons including apparatus for sealing the drive-end according to the invention.

Referring to the drawings and firstly to FIG. 1, dry coal to be hydrogenated, in the form of powder or pieces, is supplied to a feed hopper 1 through a feed opening which can be closed by a pressure valve 2. The coal then passes through a cellular wheel lock 3 and a feed aperture 18 into a preparation chamber 4 within a cylinder 5. The chamber 4 contains a friction feed element 6 which has a conveying web 7 thereon and is rotated by means of a drive and gearing 10.

The rotatable element 6 extends into a hydrogenation portion 9 of the chamber and, in the chamber 9, is in the form of a rotor 8 with vanes 11 thereon.

Static mixing nozzles 12 extend through a cylinder 13 of the hydrogenation portion 9 of the chamber radially and axially at equal spacings towards the axis of the rotor 8. The nozzles 12 can be closed by non-return valves (not shown) and are connected to a hydrogen supply system 15, which can be supplied with hydrogen from a hydrogen source by way of a compressor 16. The coal which is fed into the preparation chamber 4 by means of the cellular wheel lock 3 is compressed by the rotational movement of the friction element 6 and is subjected to movement which generates strong frictional heat. The compressing movement generating the frictional heat plasticizes the coal, so that it enters the hydrogenation chamber 9 in a plastic state.

In the hydrogenation chamber 9 the plastic coal is subjected to intensive mixing and eddying by the vanes 11 on the rotor 8 and the static mixing nozzles 12. At the same time the nozzles 12 inject hydrogen into the chamber 9, thereby setting in motion and accelerating the hydrogenation reaction, which is exothermic.

A temperature of up to 450° C. and a pressure of up to 400 bars in the hydrogenation chamber 9 is necessary to carry out the hydrogenation reaction. The pressure is built up by the rotating friction element 6 in the direction of the hydrogenation chamber 9. In the hopper 1 and within the drawing-in region of the friction element 6 there is a pressure of approximately 350 bars, rising to approximately 450 bars in the hydrogenation chamber 9.

Steps have to be taken to seal-off the pressure prevailing in the preparation chamber 4 from spreading towards the gearing and drive 10 and thereby dropping.

The invention is concerned with sealing the drive-side of the preparation chamber.

Referring to FIG. 2, a sealing substance such as charge coal, for example coal which has been ground and mixed with oil, is continuously forced out of a refillable storage container 20, through a feed passage 21, under pressure generated by a compressor 42 connected to the storage container 20, into a first annular groove 22 in the rotor. From the groove 22 the coal is fed by a conveying screw thread 23 on the friction element 6, into a conical annular gap 24 formed between a blocking member 25 of the rotor and the wall of the cylinder 5 tapering towards the preparation chamber 4.

The conical and cylindrical construction of the annular gap 24 tapering downwardly in the direction of the preparation chamber 4 enables a correspondingly high pressure to be built up and maintained as far as its preparation chamber end. In addition the conical construction of the gap 24 ensures that the entire gap will be filled evenly with charge coal at the periphery.

Since the pressure coming from the compressor 42 through the feed passage 21 is set higher than that prevailing in the preparation chamber 4, the plastic coal is forced away through the conical construction of the blocking member 25 on the rotor and enters the preparation chamber 4.

Since the pressure in the sealing region is also constantly kept higher than that in the preparation chamber 4, the charge coal is fed continuously through the conical gap into the preparation chamber 4. This ensures that the drive end of the rotating friction element 6 is sealed off absolutely securely from its gearing and back pressure bearing, in view of the very high pressure in the preparation chamber.

The sealing action may be further increased by providing a second annular groove 26, also connected by a passage 27 to the storage container 20. On the rotor adjacent the first annular groove 22 and on the drive-side thereof, a locking screw thread 28 with a returning action is provided and adjacent the groove 22 and on the drive-side thereof is a cylindrical blocking portion 29.

Any charge coal in paste form, fed through the feed pipe 21 into the annular groove 22 under the pressure generated by the compressor 42, tending to flow into the drive end of the cylinder 5, will be moved back into the groove 22 by the screw thread 28. If it is not all moved back, the coal under pressure will pass through an annular gap 30 around the cylindrical portion 29 into the second annular groove 26. From here the coal is re-cycled through the passage 27 to the storage container 20, where it is put under pressure again by means of the compressor 42 and conveyed back through the pipe 21 into the first annular groove 22.

A further locking screw thread 31 with a returning action is additionally provided on the rotor adjacent to and on the drive side of the second annular groove 26. This makes absolutely sure that no charge coal will enter the back pressure bearing at the drive-side of the friction element 6 and that the pressure required for hydrogenation can be built up and maintained in the chambers 4 and 9.

The embodiment shown in FIG. 3, differs from that shown in FIG. 2 substantially in that the annular grooves are provided, not in the friction element 6 but in the cylinder 5.

The charge coal, which in this embodiment is pressurised by means of a compressing screw 34, enters the first annular groove 32 formed in the cylinder 5. From here the coal enters a conical annular gap 35 adjoining the groove 32 at the preparation chamber side, after which it passes through an annular gap 36 into the preparation chamber 4.

A further, second annular groove 33 may additionally be provided in the cylinder 5 at the drive-side, to pick up any coal in paste form which may pass, from the groove 32 through an annular gap 37. The coal picked up in the gap 33 passes through the pipe 27, back to the storage container 20, where it is again conveyed back by the compressing screw 34, through the pipe 21 and into the first annular groove 32.

With this sealing arrangement too the pressure in the first groove 32 is maintained higher than that in the preparation chamber 4. In the embodiment of FIG. 3, the diameter of the shaft of the rotor is constant throughout the sealing region, the conical gap 35 being formed by suitably milling the cylinder 5.

Pressure control can be effected using a pressure gauge 38, which senses the pressure in the groove 32, and a pressure gauge 39 which senses the pressure in the preparation chamber 4. The two pressures are compared by a control device 40, and the pressure generated by the compressing screw 34 is controlled in accordance with these values, so as to make the pressure in the first groove 32 higher than that in the preparation chamber 4. This measure ensures, firstly that the pressure in the preparation chamber 4 will always be maintained, and secondly that no charge coal will enter the gear end of the friction element and of the drive and back pressure bearing provided there.

A similar arrangement can obviously be used in the embodiment of FIG. 2 and in such embodiment would control the compressor 42.

To prevent the heat from the cylinder 5 being transmitted to the drive, circumferential tempering passages 41 are provided. These are supplied by a tempering system (not shown) with a reversible action so that it can act as a heating means in the starting up phase and as a cooling means during subsequent operation.

If a compressing screw 34 is used as in the embodiment of FIG. 3 to build up the pressure in the first groove 32, the control device 40 will adjust the rotational speed of the screw 34 and thus the pressure in the groove 32, so as to give a constantly higher pressure than that in the preparation chamber 4.

The pipes 21 and 27, the storage container 20 and the compressor 42 or compressing screw 34 may alternatively be arranged above the sealing region of the element 6 at the drive side. The advantage of such an arrangement is that it particularly facilitates the process of feeding the charge coal into the grooves 22 and 32.

What is claimed is:

1. Apparatus for hydrogenating coal with hydrogen to form hydrocarbons and for sealing the drive-end of a preparation and hydrogenation chamber comprising a chamber, a hollow cylinder defining said chamber, a rotatable element contained in said chamber to convey particles of coal from a preparation portion of said chamber into and through a hydrogenation portion of said chamber, a sealing region at the drive-side of said rotatable element, said sealing region comprising a conical annular gap formed between the wall of said hollow cylinder and said rotatable element adjacent an aperture for feeding the coal into said preparation portion of said chamber, said conical annular gap tapering towards said preparation portion of said chamber, a first annular space on the drive-side of said conical annular gap, a feed passage communicating said first annular space with a storage container and means for recirculating a sealing substance in paste form from said storage container, under pressure, through said feed passage into said first annular space.

2. Apparatus as claimed in claim 1, further comprising, on the drive-side of said first annular space and on said rotatable element, a locking screw thread and a cylindrical blocking portion with approximately the diameter of said hollow cylinder, a second annular space and a discharge passage connecting said second annular space to said storage container.

3. Apparatus as claimed in claim 2, wherein said conical annular gap tapering towards said preparation portion of the chamber is larger than a gap between said cylindrical blocking portion of said rotatable element and said wall of the hollow cylinder.

4. Apparatus as claimed in claim 1, including tempering channels provided in said cylinder in said sealing region.

5. Apparatus as claimed in claim 1, wherein said first annular space is formed by an annular groove of semi-circular section in said rotatable element.

6. Apparatus as claimed in claim 2, wherein said second annular space is formed by an annular groove of semi-circular section in said rotatable element.

7. Apparatus as claimed in claim 1, wherein said conical annular gap tapering towards said preparation portion of said chamber is formed between a conical portion of said rotatable element and said wall of said hollow cylinder.

8. Apparatus as claimed in claim 1, wherein said first annular space is formed by an annular groove of semi-circular section in said wall of said hollow cylinder.

9. Apparatus as claimed in claim 2, wherein said second annular space is formed by an annular groove of semi-circular cross-section in said wall of said hollow cylinder.

10. Apparatus as claimed in claim 1, wherein said conical annular gap tapering towards said preparation portion of said chamber is formed between a cylindrical portion of said rotatable element and a conically tapering portion of said wall of said hollow cylinder.

* * * * *